US005239610A

United States Patent [19]
Shao

[11] Patent Number: 5,239,610
[45] Date of Patent: Aug. 24, 1993

[54] WALL MOUNTED PLUG-IN ELECTRIC SPACE HEATER WITH MOUNTING CLIP FOR PREVENTING ACCIDENTAL UNPLUGGING

[75] Inventor: Steve Shao, Framingham, Mass.

[73] Assignee: Holmes Products Corp., Milford, Mass.

[21] Appl. No.: 720,403

[22] Filed: Jun. 25, 1991

[51] Int. Cl.[5] .................... H05B 3/00; F24H 3/04; H02B 1/00
[52] U.S. Cl. ...................... 392/363; 174/54; 174/56; 392/365; 392/370; 392/381; 392/430; 392/436
[58] Field of Search .............. 392/392, 363, 370, 430, 392/436, 437, 380; 174/54–56, 66

[56] References Cited
U.S. PATENT DOCUMENTS

| 1,244,454 | 10/1917 | Adam | 174/54 X |
| 1,486,896 | 3/1924 | Hubbell | 174/54 X |
| 2,052,983 | 9/1936 | Long | 392/363 X |
| 2,196,786 | 4/1940 | Wahl | 174/56 X |
| 2,583,353 | 1/1952 | Bishofberger | 174/54 X |
| 2,665,330 | 1/1954 | Wong | 174/54 X |
| 3,861,136 | 1/1975 | Blenkhorn | 174/54 X |
| 4,409,536 | 10/1983 | Evjen | 174/54 X |
| 4,536,694 | 8/1985 | McCarty et al. | 174/54 X |
| 4,804,821 | 2/1989 | Glucksman | 392/392 X |
| 4,873,422 | 10/1989 | Streich et al. | 392/363 |

FOREIGN PATENT DOCUMENTS

| 2511421 | 9/1976 | Fed. Rep. of Germany | 392/363 |
| 3520999 | 10/1986 | Fed. Rep. of Germany | 392/363 |

*Primary Examiner*—Anthony Bartis
*Attorney, Agent, or Firm*—Kriegsman & Kriegsman

[57] ABSTRACT

An electric heating assembly adapted to be mounted onto and plugged into a wall-mounted electrical outlet includes a heating unit having a plug member an a back wall, thereof which is directly mateable with a power receptacle of the electrical outlet. The heating assembly also includes a mounting clip for securely coupling the heating unit to the electrical outlet so that the heating unit will not become inadvertently disengaged therefrom. The mounting clip includes a generally rectangular base portion securable to the outlet plate of the electrical outlet with the screw used to mount the outlet plate. The mounting clip also includes a pair of legs which extend away from the base portion and which mate with a pair of holes formed in the back wall of the heating unit above the plug member.

13 Claims, 8 Drawing Sheets

WALL MOUNTED PLUG-IN ELECTRIC SPACE HEATER WITH MOUNTING CLIP FOR PREVENTING ACCIDENTAL UNPLUGGING

BACKGROUND OF THE INVENTION

The present invention relates generally to electric heaters and more particularly to wall-mounted electric heaters.

Conventional electric heaters, which are designed to provide auxiliary heat for individual rooms or spaces within a house, are typically small, portable units that sit on the floor. These conventional units typically have a standard length power cord which is adapted to be plugged into one of the receptacles of a wall-mounted electrical outlet. Because the possibility exists with these conventional units that the unit can be exposed to standing water while the unit is still receiving power through the power cord, the use of these units in bathrooms, where standing water is commonplace, clearly poses a risk of electrocution.

In U.S. Pat. No. 4,873,422 to H. K. Streich et al., there is described a wall-mounted heater assembly with plug mount and support. The heater assembly includes a cover, heater means disposed within the cover for generating heat only when electrical power is received, a fan disposed within the cover for forcing cool air into the cover to be heated by the heater means and for discharging heated air out of the cover, a power plug that is mateable directly with a wall-mounted electrical receptacle to provide power to the heater means only when the plug is mated with the receptacle, means for mounting the plug directly in the cover so that the plug acts to directly support the cover only when the plug is mated with the receptacle, and a pair of support legs situated on the cover below the plug and extending in a backward direction for contacting the wall below the receptacle so as to prevent the plug from being pulled out the receptacle due to the weight of the heater assembly.

As can be appreciated, one advantage of the above-described wall-mounted heater assembly, as compared to conventional electric heaters, is that power is immediately cut off from the unit when the heater assembly becomes disengaged from the wall, i.e., when the plug is removed from the receptacle. Accordingly, the heater assembly is not likely to come into contact with standing water while it is receiving electricity.

One disadvantage with the above-described wall-mounted heater assembly is that, when it is plugged into a receptacle, it is maintained therein solely by the action of the support legs, which as noted above, merely reduces the torque on the plug so as to prevent the plug from being pulled out of the receptacle due to the weight of the assembly. Neither the support legs nor any other feature of the above-described heater assembly prevents the plug from being accidentally removed from the receptacle (and, consequently, the assembly from becoming disengaged from the wall) if the heater is pulled away from the wall, as would be the case if a child were to pull on the unit or if someone or something were to inadvertently brush up against the unit.

SUMMARY OF THE INVENTION

Accordingly, it is an object of the present invention to provide a new and improved wall-mounted electric heater assembly.

It is another object of the present invention to provide a wall-mounted electric heater assembly as described above that plugs directly into a receptacle of a wall-mounted electrical outlet.

It is still another object of the present invention to provide a wall-mounted electric heater assembly as described above that does not easily become accidentally disengaged from the wall when inadvertently pulled away therefrom.

It is still another object of the present invention to provide a wall-mounted electric heater assembly as described above that is easy to assemble, easy to install, and easy to operate.

Additional objects, as well as features and advantages of the present invention, will be set forth in part in the description which follows, and in part will be obvious from the description or may be learned by practice of the invention. The objects, features, and advantages of the present invention may be realized and attained by means of the instrumentalities and combinations particularly pointed out in the appended claims.

Accordingly, to achieve the foregoing objects and in accordance with the purpose of the present invention, as embodied and broadly described herein, an electric heater assembly for heating a space contained at least in part by a wall, the wall having mounted therein an electrical outlet including a receptacle, comprises a heating unit. The heating unit includes a heating element for generating heat when receiving electrical power, a cover surrounding and supporting said heating element, a plug extending outwardly a short distance from said cover to mate directly with the electrical receptacle so as to provide power to said heating element. The electric heater assembly also includes means for securely coupling said heating unit to the wall so as to prevent the heating unit from becoming accidentally disengaged therefrom.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In these drawings wherein like reference numerals represent like parts.

DETAILED DESCRIPTION OF PREFERRED EMBODIMENTS

The present invention is directed to a new construction for a wall-mounted electric heater assembly. An important feature of this construction is the inclusion of a mechanism for keeping the assembly from becoming accidentally or inadvertently disengaged from the wall on which it is mounted.

Figure 1:
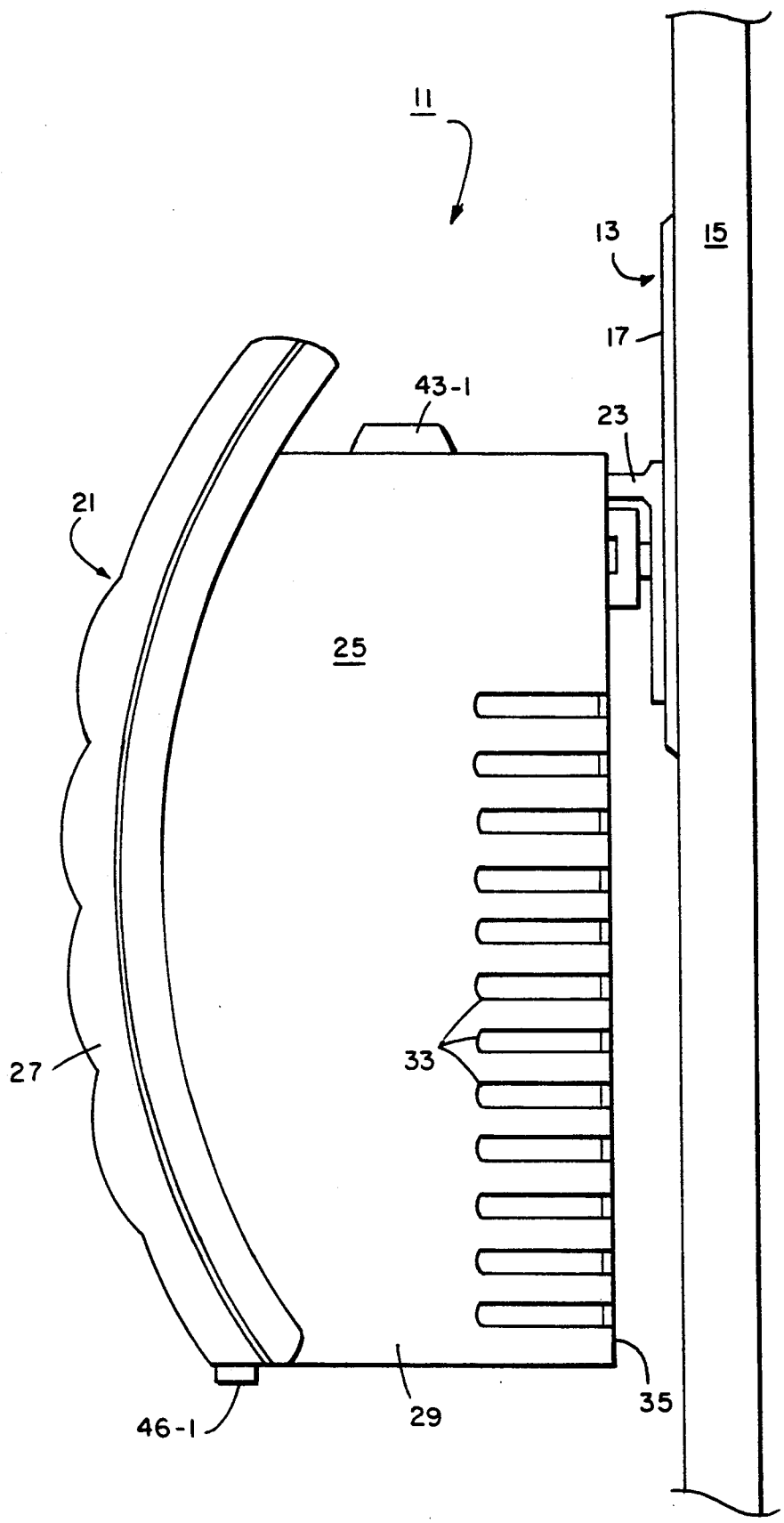
FIG. 1 is a side view of a preferred embodiment of an electric heater assembly constructed according to the teachings of the present invention, the electric heater assembly being shown mounted onto and plugged into a wall-mounted electrical outlet.

Referring now to the drawings and in particular to FIG. 1, there is shown a preferred embodiment of a wall-mounted electric heater assembly constructed according to the teachings of the present invention, the heater assembly being represented generally by reference numeral 11.

For simplicity, parts of heater assembly 11 not pertinent to the invention will not be shown or discussed.

Assembly 11 is shown mounted onto and plugged into a conventional wall-mounted electrical outlet 13. It is to be understood that outlet 13 is mounted in a conventional manner on a substantially vertical wall surface 15. Outlet 13 includes an outlet plate 17, which is affixed to wall surface 15 with a screw 19 (see FIG. 7). Outlet 13 also includes a pair of conventional 110 volt power receptacles 20 (see FIG. 7), each receptacle including two spade plug receivers and a third ground plug receiver arranged in a standard configuration.

As can been seen, assembly 11 includes a heating unit 21 and a mounting clip 23.

Figure 2:
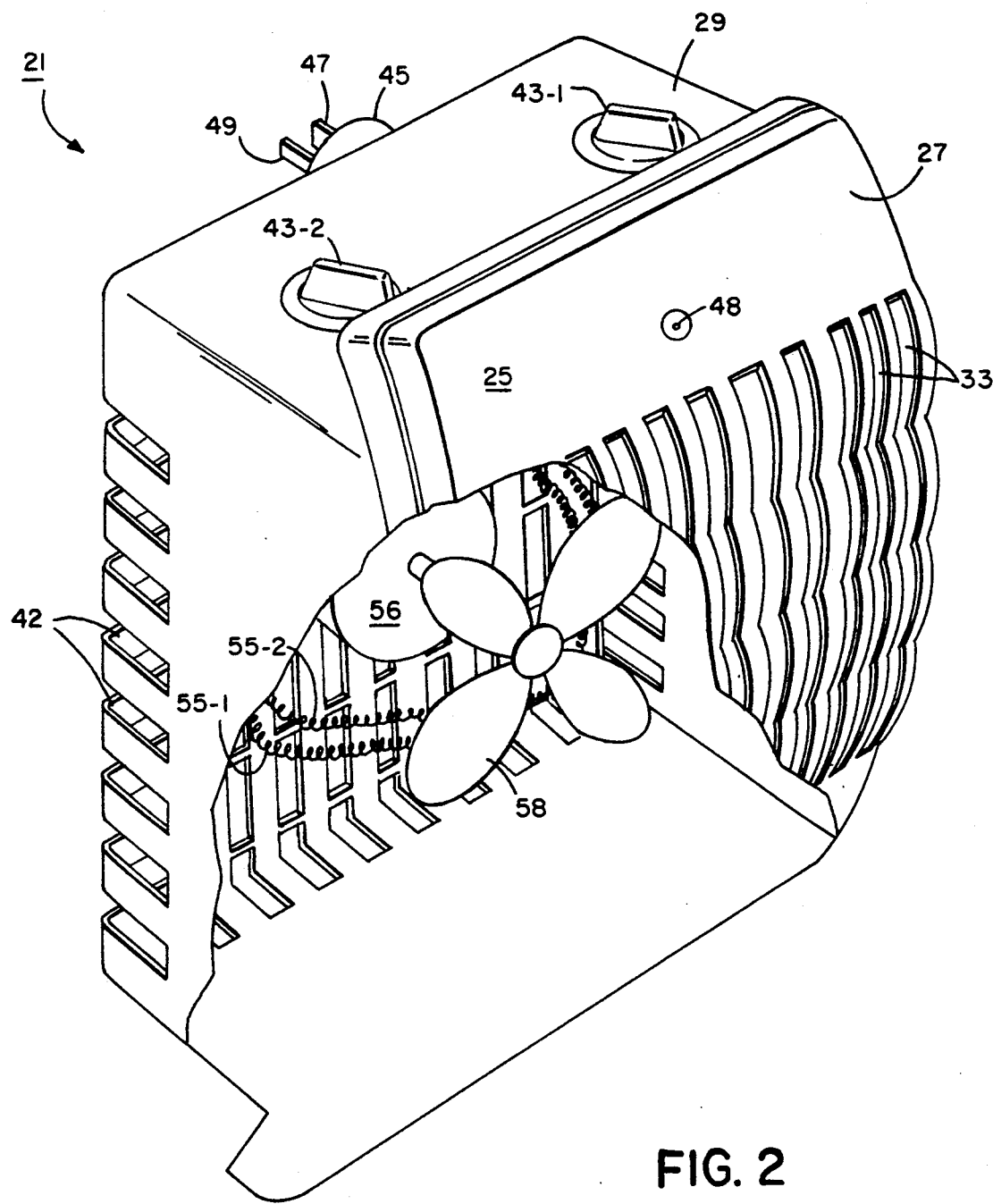
FIG. 2 is a front perspective view, broken away in part, of the heating unit shown in FIG. 1.
Figure 3:
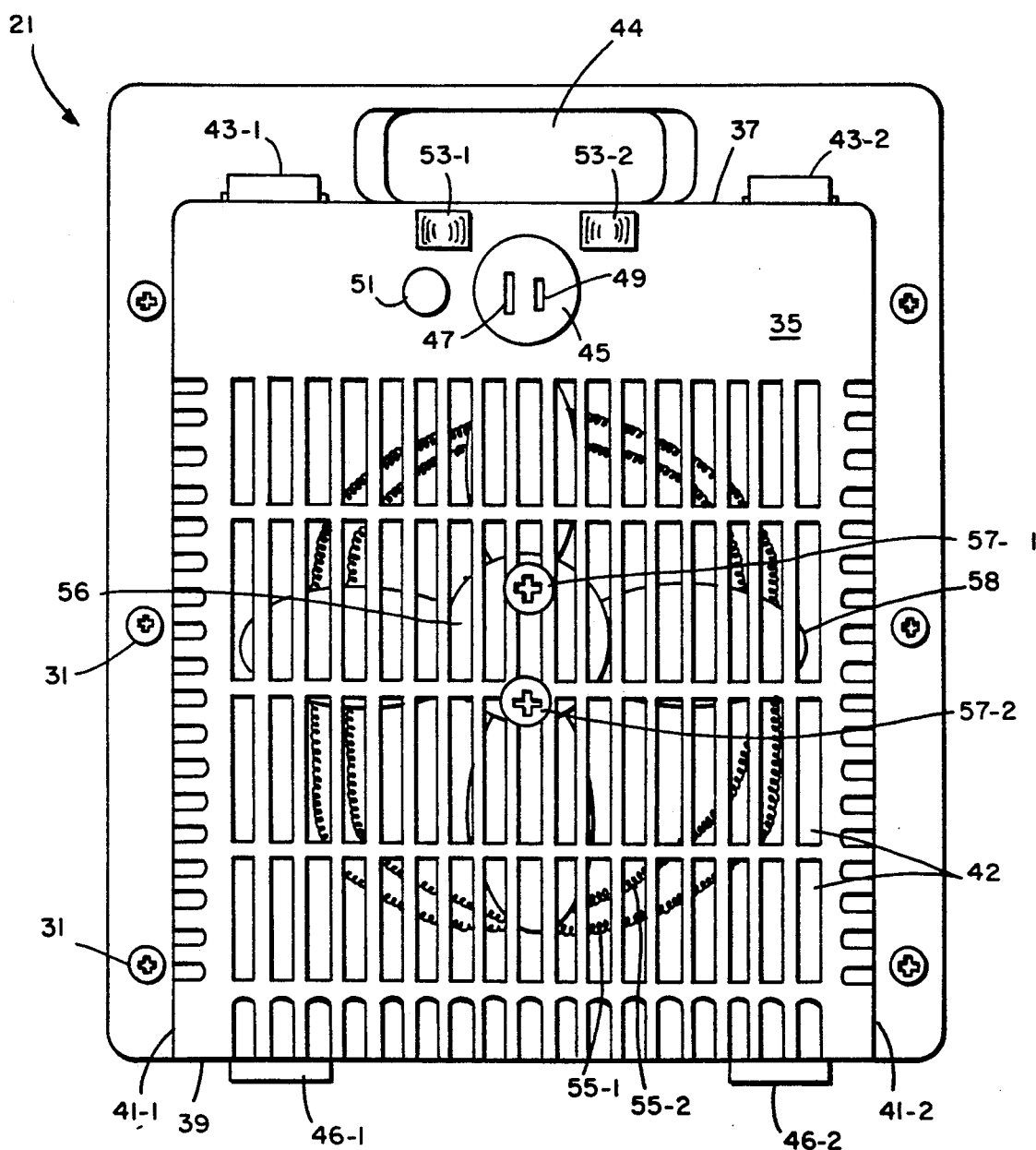
FIG. 3 is a rear view of the heating unit shown in FIG. 1.
Figure 4:
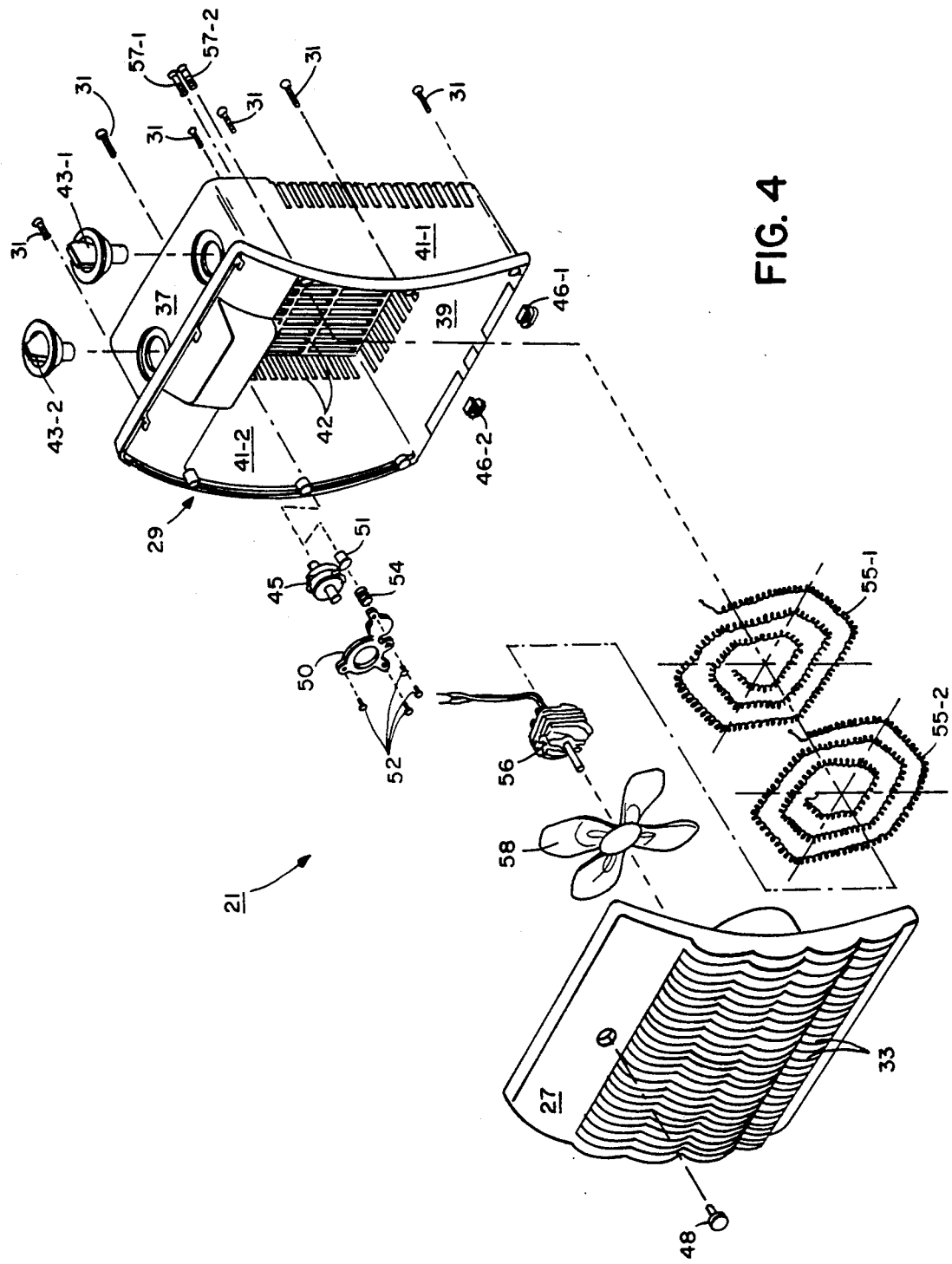
FIG. 4 is an exploded perspective view of the heating unit shown in FIG. 1.

Referring now to FIGS. 2-4, heating unit 21 is shown in greater detail. Heating unit 21 includes a cover 25 for surrounding and supporting the internal components of unit 21. Cover 25 may be formed from any conventional material suitable for use in a heater unit. Preferably, cover 25 is formed from a high-impact plastic material that can withstand the heat generated from within unit 21.

Cover 25 includes a front section 27 and a back section 29, front section 27 and back section 29 being joined together by a plurality of screws 31. Front section 27, which is generally convex in shape, has a plurality of slotted openings 33, through which heated air is discharged. Back section 29, which is generally rectangular in shape, includes a cavity, which is defined by a back wall 35, a top wall 37, a bottom wall 39, a pair of side walls 41-1 and 41-2, and an open front. A plurality of slotted openings 42 are disposed along back wall 35, bottom wall 39, and side walls 41 to admit unheated air into cover 25. The orientation of openings 42 is arranged to minimize obstruction of air inflow into cover 25 even though heating unit 21 is mounted close to the wall. Back section 29 also includes an integrally formed, generally rectangular, inset handle 44 for use in carrying unit 21.

A pair of rubber support legs 46-1 and 46-2, whose purpose will be discussed below, are mounted on the bottom of heating unit 21.

A pair of switches 43-1 and 43-2 are mounted in top wall 37. Switch 43-1, which is electrically connected to the fan and the heating element disposed within cover 25, is a four position switch, which may be placed in an off position, in which case the fan is not operated, in a fan position, in which case the fan only is operated, in a first heater/fan position, in which case both the fan and a heater disposed within the cover are operated with the fan being operated at a high speed, and in a second heater/fan position, in which case both the fan and the heater are operated with the fan being operated at a low speed.

Switch 43-2 is a variable control switch, which is electrically connected to the heater and which regulates the amount of heat generated thereby. Switch 43-2 is also electrically connected to a power indicator light 48, which is mounted on front section 27.

Assembly 11 also includes a plug member 45. Member 45 is adjustably rotatably mounted in a bracket 50, which is in turn fixedly mounted with a plurality of screws 52 in the upper rear portion of back wall 35. Plug member 45 includes a pair of power spade connectors 47 and 49, respectively, which are adapted for insertion into an electrical receptacle and which are configured to provide electricity to the heater and fan through switches 43-1 and 43-2. The angular orientation of plug member 45 within bracket 50 is made to be adjustable between two or more positions to allow heating unit 21 to be plugged into electrical receptacles of various configurations. To permit the angular adjustment of plug member 45, a release button 51 is provided in back wall 35. Release button 51 is coupled to bracket 50 through a spring 54 so that, when it is depressed, bracket 50 becomes disengaged from plug member 45.

Back wall 35 also includes a pair of generally rectangular holes 53-1 and 53-2, respectively, which are disposed slightly above plug member 45 and on either side thereof. As will be discussed below in greater detail, holes 53 are adapted to receive the male members of mounting clip 23 in such a way so as to secure unit 21 to outlet plate 17.

Assembly 11 further includes a pair of heating elements 55-1 and 55-2. Heating elements 55, which are conventional resistive type heating elements known in the art, are disposed inside cover 25 a short distance from back wall 35. It will be understood that several different types of heating elements could be adapted for use in the heating unit 21 of the present invention.

Assembly 11 additionally includes a fan motor 56 and a set of fan blades 58 disposed within cover 25. Fan motor 56 is mounted on the inside of back wall 35 with a pair of screws 57-1 and 57-2. Fan blades 58, which are disposed in front of heating elements 55, are so configured to draw cool air in through openings 42 and to force it out through openings 33 once it has been heated. As noted above, the fan unit can be used independently of heating elements 55 to provide cooling air when no heat is desired.

Figure 5:
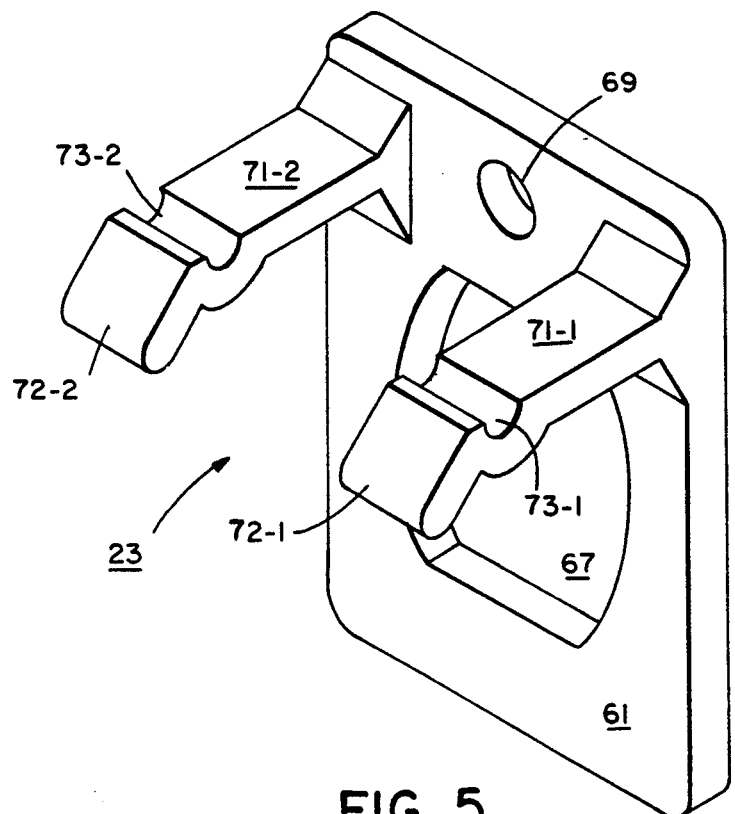
FIG. 5 is an enlarged front perspective view of the mounting clip shown in FIG. 1.
Figure 6:
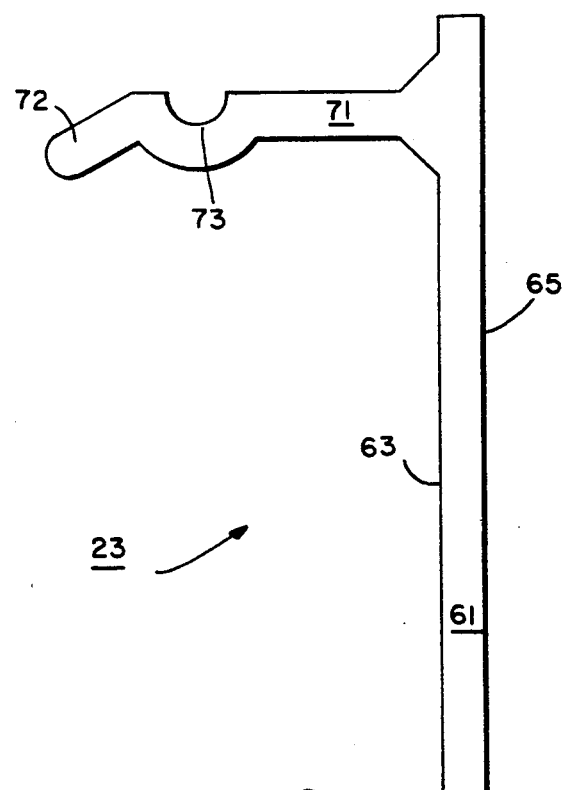
FIG. 6 is an enlarged side view of the mounting clip shown in FIG. 1.

Referring now to FIGS. 5 and 6, mounting clip 23 is shown greater detail. Clip 23, which is preferably a unitary structure molded from a strong yet lightweight plastic or other similar material, includes a generally rectangular base portion 61 having a front surface 63 and a back surface 65. An electrical receptacle opening 67 and a screw hole 69, both of whose functions will be described below, are formed in base portion 61.

Clip 23 also includes a pair of generally rectangular legs 71-1 and 71-2, which extend outwardly from front surface 63 of base portion 61. As will be discussed below in greater detail, legs 71-1 and 71-2 are sized and shaped to fit into holes 53-1 and 53-2, respectively. Each of legs 71 includes a downwardly angled tip 72, which serves to maintain leg 71 within hole 53. Each leg 71 also includes a notch 73, located proximate to tip 72, which is used to engage back wall 35 when leg 71 is fully inserted into hole 53.

Figure 7:
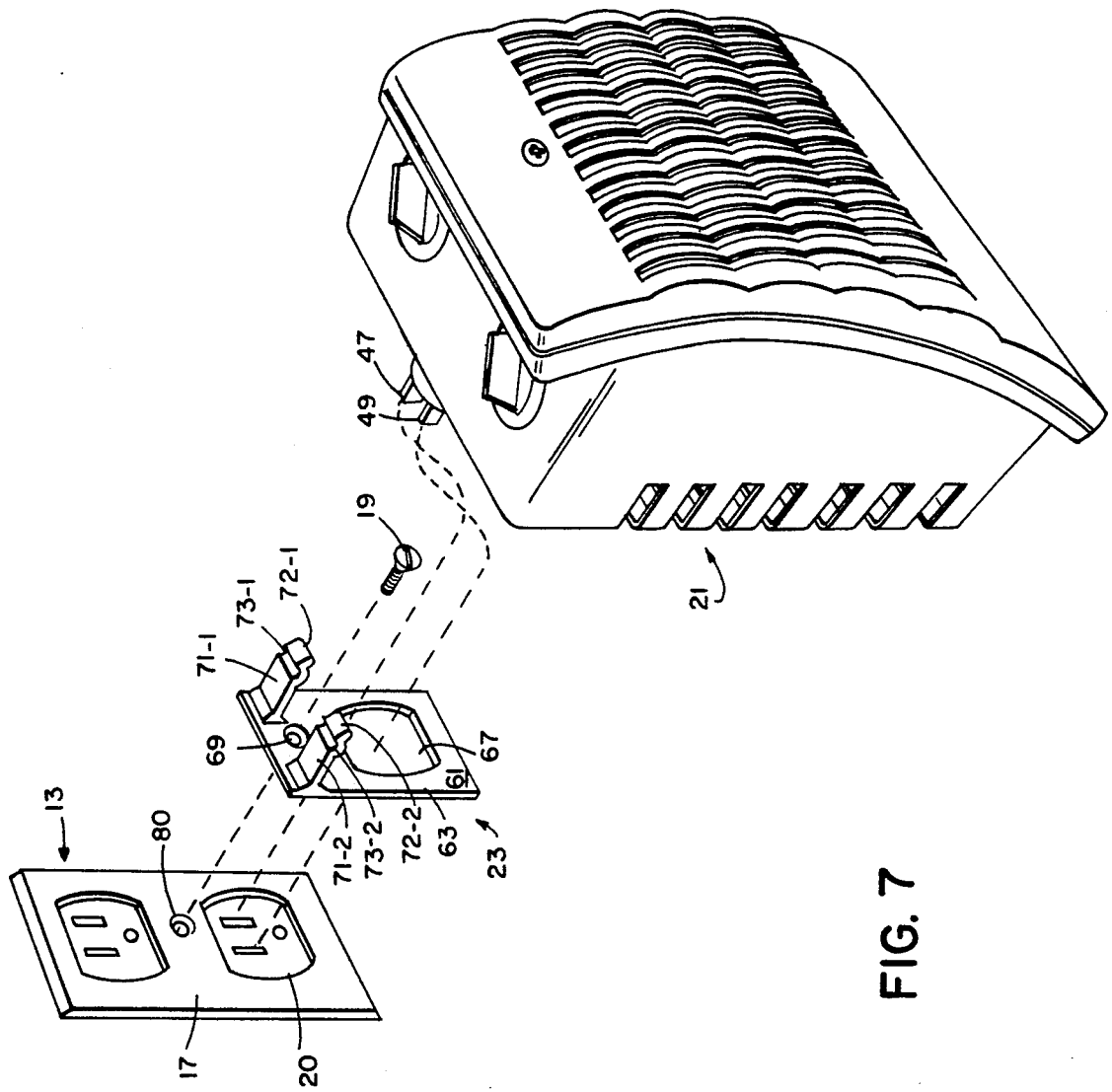
FIG. 7 is a partially exploded perspective view showing how the electric heater assembly of FIG. 1 is mounted onto and plugged into a wall-mounted electrical outlet.

Referring now to FIG. 7, the manner in which heating assembly 11 is mounted onto and plugged into conventional wall-mounted electrical outlet 13 is shown in greater detail. As can be seen, screw 19 is first removed from a screw hole 80 formed in outlet plate 17. Clip 23 is then oriented relative to outlet plate 17 so that receptacle opening 67 and screw hole 69 are aligned with power receptacle 20 and screw hole 80, respectively. Clip 23 is then secured to plate 17 by inserting screw 19 into holes 69 and 80, respectively.

With clip 23 thus mounted on outlet 13, heating unit 21 is then positioned relative to clip 23 so that legs 71 become inserted into holes 53 of cover 25 and so that connectors 47 and 49 of plug member 45 become inserted into receptacle 20. Because tips 72 extend downwardly within holes 53 and because notches 73 engage back wall 35 in the manner described above, heating unit 21 cannot easily be inadvertently disengaged from wall 15, even if unit 21 is pulled directly away from wall 15. In fact, to disengage heating unit 21 from wall 15 once unit 21 has been connected to clip 23 in the manner described above, unit 21 must be manipulated relative to clip 23 so that tips 72 will not obstruct removal of legs 71 from holes 53.

As can be clearly seen in FIG. 1, when heating unit 21 is mounted on a wall using clip 23, cover 25 does not come into contact with the wall below plug member 45.

Figure 8:
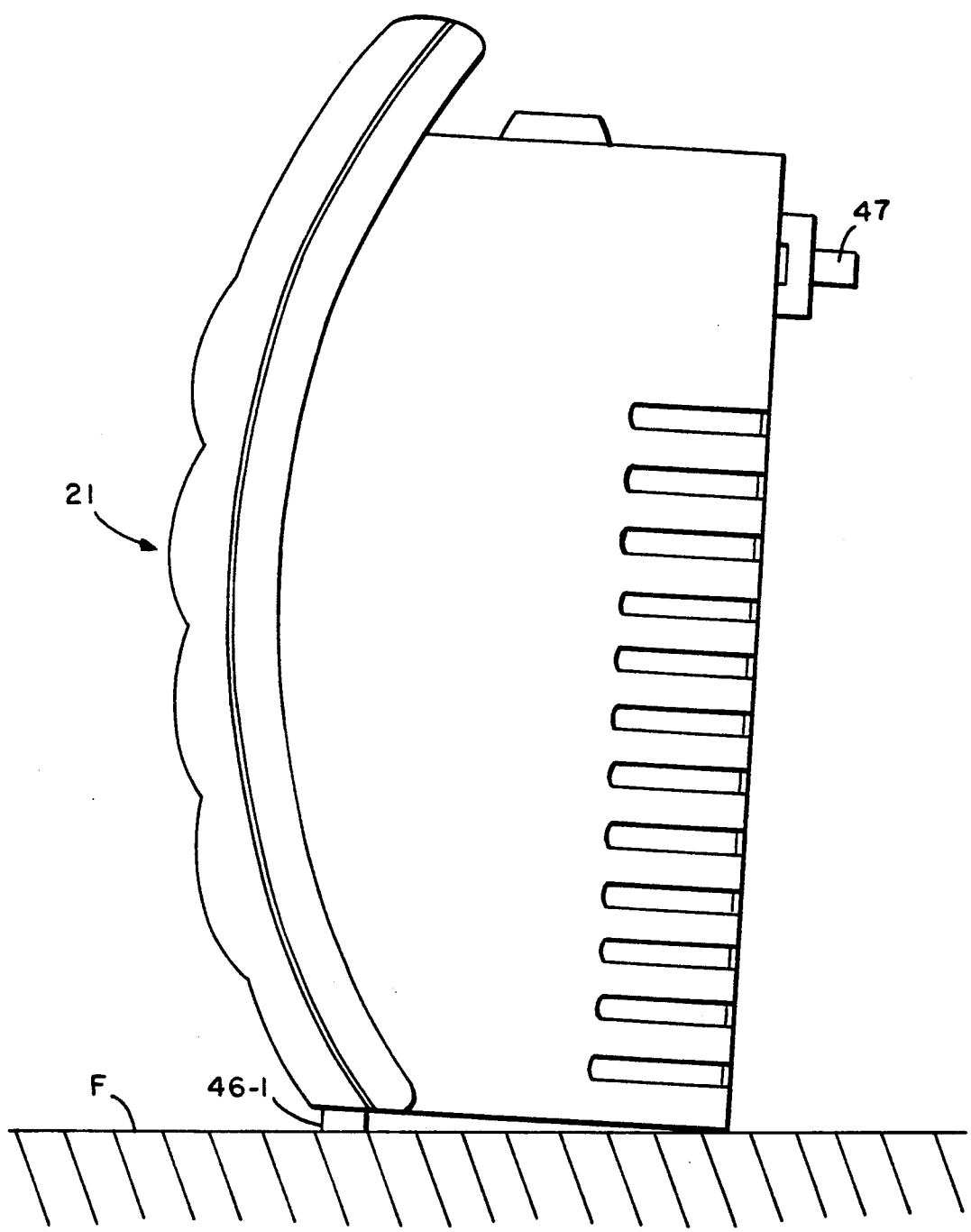
FIG. 8 is a side view showing how the heater unit may be seated on a floor or other horizontal surface.
Figure 9:
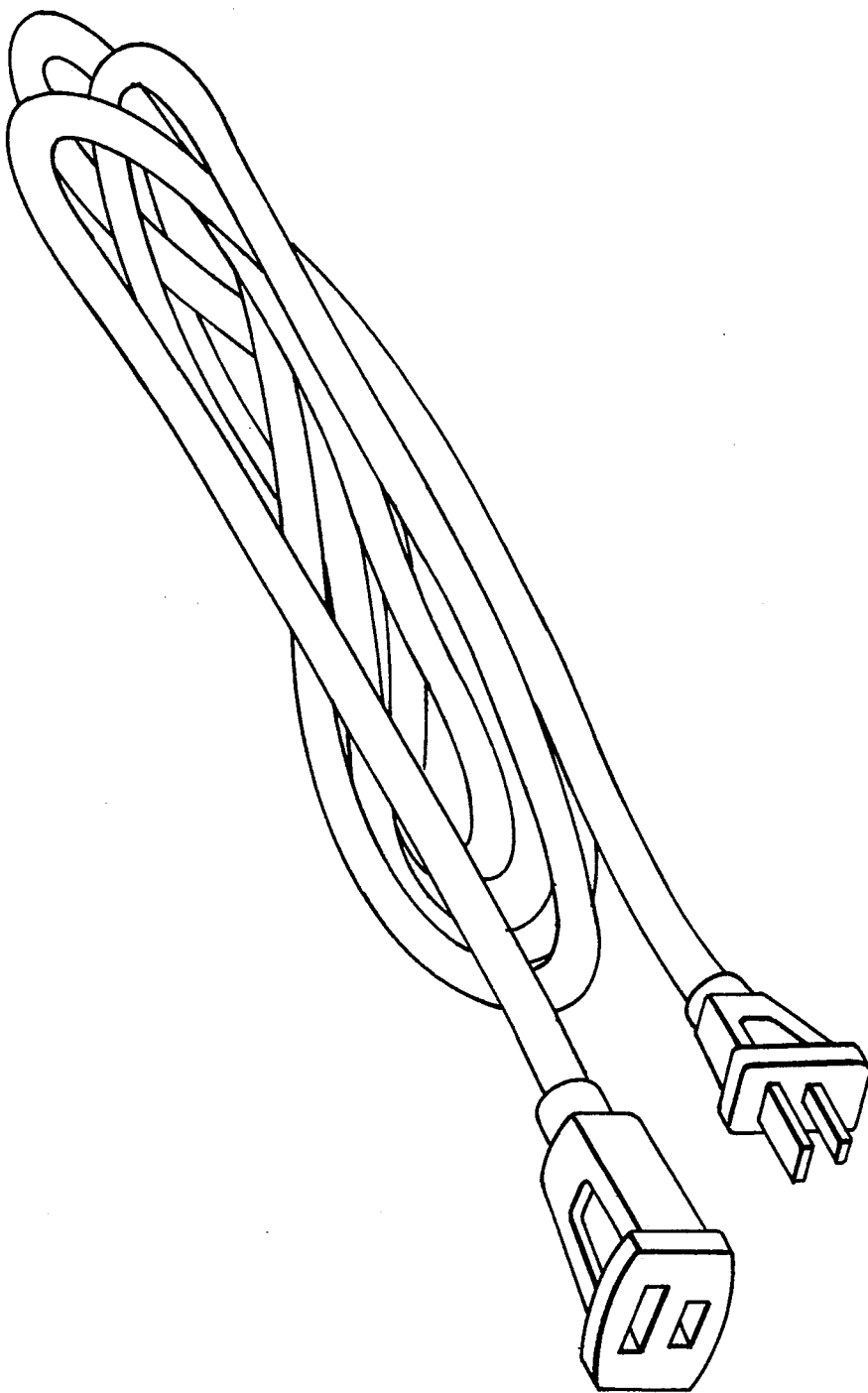
FIG. 9 is a perspective view of a conventional extension cord which may be used with the heating unit of this invention.

Instead of being mounted on a wall in the manner described above, heating unit 21 may rest in an upright fashion on a flat surface F, such as a floor, table top, or the like as shown in FIG. 8. When used in this manner, an extension cord, such as is shown in FIG. 9, is typically used to electrically couple spade connectors 47 and 49 of plug member 45 to power receptacle 20.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electric heater assembly for heating a space contained at least in part by a wall, the wall having mounted therein an electrical outlet including a receptacle, an outlet plate, and a screw for securing said outlet plate to the wall, said electric heater assembly comprising:
   a) a heating unit, said heating unit including
      i) a heating element for generating heat when receiving electrical power,
      ii) a cover for surrounding and supporting said heating element, said cover including a back wall, said back wall having an opening formed therein,
      iii) a plug mounted in said back wall of said cover, said plug being situated below said opening in said back wall and being mateable directly with a receptacle so as to provide power to said heating element; and
   b) means for securely coupling said heating unit to a wall so as to prevent said heating unit from becoming accidentally disengaged from the wall, said coupling means comprising a mounting clip adapted to be removably mounted on the outlet plate of a wall receptacle by the screw securing the outlet plate to the wall, said mounting clip having an outwardly extending leg, said outwardly extending leg having means, engageable with said cover when said outwardly extending leg is inserted into said opening, for securing the heater unit in place on the receptacle when said plug is plugged into the receptacle.

2. The electric heater assembly as claimed in claim 1 wherein said heating unit further includes means for forcing air into said cover to be heated by said heating element and to be discharged out of said cover to heat the space.

3. The electric heater assembly as claimed in claim 2 wherein said forcing means includes a fan disposed within said cover.

4. The electric heater assembly as claimed in claim 1 wherein said outwardly extending leg has an angled tip for maintaining said outwardly extending leg in said opening.

5. An electric heater assembly for heating a space contained at least in part by a wall, the wall having mounted therein an electrical outlet including a receptacle, an outlet plate, and a screw for securing said outlet plate to the wall, said electric heater assembly comprising:
   a) a heating element for generating heat when receiving electrical power;
   b) a cover for surrounding and supporting said heating element, said cover including a back wall, said back wall having a pair of openings formed therein,
   c) a plug mounted in said back wall of said cover, said plug being situated below said pair of openings in said back wall and being mateable directly with a wall receptacle so as to provide power to said heating element; and
   d) a mounting element for interconnecting said cover and the wall in such a way as to prevent said heating unit from becoming accidentally disengaged from the wall, said mounting element comprising a base portion, said base portion being adapted to be removably mounted on the outlet plate of a wall outlet by the screw securing the outlet plate to the wall, and a pair of outwardly extending legs, said pair of outwardly extending legs having means, engageable with said cover when said pair of outwardly extending legs are inserted into said pair of openings, for securing the heater unit in place on the receptacle when said plug is mated with the receptacle.

6. The electric heater assembly as claimed in claim 5 further comprising means for forcing air into said cover to be heated by said heating element and to be discharged out of said cover to heat the space.

7. The electric heater assembly as claimed in claim 6 wherein said forcing means includes a fan disposed within said cover.

8. The electric heater assembly as claimed in claim 5 wherein said base portion includes a screw hole through which the screw may be inserted for removably mounting said mounting element on the outlet plate.

9. The electric heater assembly as claimed in claim 8 wherein said base portion is generally rectangular in shape and includes a receptacle opening adapted to fit over the receptacle to permit said plug to be inserted thereinto.

10. The electric heater assembly as claimed in claim 9 wherein each of said outwardly extending legs includes an angled tip adapted to maintain said outwardly extending legs in said openings.

11. A fan assembly for circulating air in a space contained at least in part by a wall, the wall having mounted therein an electrical outlet including a receptacle, an outlet plate, and a screw for securing said outlet plate to the wall, said fan assembly comprising:
   a) a fan unit including
      i) a fan for blowing air when receiving electrical power.
      ii) a cover for surrounding and supporting said fan, said cover including a back wall having an opening formed therein,
      iii) a plug mounted in said back wall of said cover, said plug being situated below said opening in said back wall and being mateable directly with a wall receptacle so as to provide power to said heating element; and
   b) means for securely coupling said fan unit to the wall so as to prevent said fan unit from becoming accidentally disengaged from the wall, said coupling means comprising a mounting clip adapted to be removably mounted on a wall outlet plate by the screw securing the outlet plate to the wall, said mounting clip having an outwardly extending leg, said outwardly extending leg having means, engageable with said cover when said outwardly extending leg is inserted into said opening, for securing the heater unit in place on the receptacle when said plug is mated with the wall receptacle.

12. The fan assembly as claimed in claim 11 wherein said outwardly extending leg has an angled tip for maintaining said outwardly extending leg in said opening.

13. An electric heater assembly for heating a space contained at least in part by a wall, the wall having mounted therein an electrical outlet including a receptacle, an outlet plate, and a screw for securing said outlet plate to the wall, said electric heater assembly comprising:
   a) a heating unit, said heating unit including
      i) a heating element for generating heat when receiving electrical power,
      ii) a cover for surrounding and supporting said heating element, said cover including a back wall having a first mating member formed thereon,
      iii) a plug mounted in said back wall of said cover, said plug being disposed below said first mating member on said back wall and being mateable directly with a wall receptacle so as to provide power to said heating element, and
   b) means for securely coupling the heating unit to the wall so as to prevent said heating unit from becoming accidentally disengaged from the wall, said coupling means comprising a mounting clip adapted to be mounted on the outlet plate of the wall receptacle, said mounting clip having a second mating member adapted for detachable engagement with said first mating member on said cover.

* * * * *